2,916,378
PROCESS FOR MAKING CORN CHIPS

Basil H. Kunce, John T. Long, Jr., and George G. Olson, Phoenix, Ariz., assignors to Fiesta Foods Corporation, Phoenix, Ariz., a corporation of Arizona No Drawing. Application March 9, 1959
Serial No. 797,858

1 Claim. (Cl. 99—80)

This invention pertains to an improved process for making corn chips and is particularly directed to a process for making corn chips of crisp edible character.

One of the objects of this invention is to produce corn chips by a unique process by which they have a very low oil content and are only .060 of an inch thick (60 thousandths) while having a crunchy, flaky texture due to numerous small bubbles or blisters on the surface.

This is a continuation-in-part application of application Serial No. 743,997, filed June 23, 1958.

Another object of this invention is to provide a new process that utilizes a rolling and cutting technique to form the chip and a drying or dehydration step prior to cooking in the shortening or cooking oil.

A further object of this process is to provide a chip with a much lower oil content in the finished product by dehydration of the corn dough prior to frying in oil so as to reduce the oil absorption by the chip from 25% to 35% over methods heretofore used.

Another object is to cut the dough prior to drying and frying so as to permit the corn chip to be made in a variety of sizes and shapes.

The new process also makes it practicable to produce a corn chip of the same essential shape and thickness as a potato chip, a matter not heretofore possible.

And a still further object is to provide a process which gives careful control of a number of variables to produce the desired effects in the end product, over the established method of producing a corn chip, which permits a much wider variance in the degree to which the corn is cooked, the fineness of the grind and moisture content of the dough.

The present process used to produce this new and improved corn chip is as follows: Dry whole kernel yellow corn with a moisture content of 10% to 14% is placed in a suitable vessel and enough water added to just cover the corn. The mixture is heated externally until a temperature of 170 degrees is reached. The heat is then turned off immediately and the mixture allowed to cool to room temperature. Care must be taken not to heat the corn to a temperature substantially above 170 degrees F. or the resulting dough will be too sticky to roll and cut to the desired shape. When the corn has cooled to room temperature it is washed and the excess water allowed to drain off. The moist, cooked corn is then ground by suitable means to a fineness such that 100% can be washed through a U.S. No. 20 screen and 75% can be washed through a U.S. No. 325 screen.

During grinding, the moisture content of the corn dough is adjusted to approximately 50% to give the dough the proper consistency for working through the rollers and cutters.

The dough is then worked between two oppositely rotating rollers against one of which a rotating cutting bar is operating. The thickness of the resulting chip is determined by the spacing between the rollers which is held to 14 thousandths of an inch. A wire held against one of the rollers frees the cut dough from the roller and the formed chip falls off the roller by gravity onto a moving belt.

The dehydration step which follows is unique to this process and essential to produce a corn chip with the above mentioned properties. The dough as it is rolled and cut has a moisture content of 50% and in the conventional process for preparing corn chips would now be fried in oil. In this process the moisture content of the chip is reduced from 50% to not more than 20%. It has been found in practice that best results are obtained with a moisture content of 15%. The moisture content should not be lower than 10% or the resulting chip will be tough and brittle after frying.

The reason that the ordinary corn chips do not puff is that they are coursely ground so that the dough is "disconnected" and steam from moisture within the dough can readily escape from the chip during the frying process. The chip of this invention is finely ground with a smooth, continuous surface. If fried with 50% water content, they would puff because the moisture cannot readily escape. However, by reducing the moisture to 15%, just enough remains to create the small blisters which give the chip the flaky, crisp yet tender texture.

In practice it has been found that a better product is made if the moisture is removed as rapidly as possible. A convenient procedure for doing this uses a traveling metal slat belt moving through a gas fired oven. The oven is maintained at a temperature ranging from 675 degrees to 725 degrees F. and the corn chip is in the oven for a period of 30 seconds. This rapid dehydration reduces the moisture content to 15% and the chip is ready for frying. It has been observed with a rolled and cut chip that if the moisture content is above 20% the chips will puff when they are fried. The puffed chips do not cook evenly and the center cavity fills up with the cooking oil making an unpalatable product. With extruded chips this difficulty is not noticed and does not present a problem. With a moisture content of 15%, a chip with numerous small surface "blisters" is produced. The "blisters" add to the texture and flakeness of the product. The pre-baking, which drives out moisture also adds another desirable characteristic to the chip. In the production of ordinary corn chips, the moisture is replaced with oil which are "fats." Laboratory tests of former chips show a fat content of 33.18% to 34.76%. Because the moisture in the instant chip is reduced to 15% prior to frying, the replacement is much less, and the instant chips have a fat content of 25.71%. This reduction in oil content also reduces the calories. Other chips measure 2480 to 2554 calories per pound while the instant chip measures 2200 to 2343 calories per pound. The reduction in fat is great enough to make decided difference in the taste and other organoleptic characteristics. The instant chip has a drier, more dainty flavor, with no oily taste or feel that are predominant characteristics of extruded chips that are not pre-baked, with a result, the consumer can eat far more of the instant chip with no undesirable after effects that usually accompany the chips that are not pre-baked.

The chips are then fried in shortening corn oil or other vegetable oils until a light golden brown. In practice, a refined corn oil has been found superior to other oils. The chips are fried in the oil for a period of from 25 to 40 seconds at a temperature of 370 degrees F.

The chips are then drained of excess oil, salted and packaged.

Having thus fully set forth and described this invention, what is claimed is:

The process of making corn chips comprising the steps of: cooking yellow corn having an initial moisture content of 10% in water by heating said water from room temperature to 170° F., discontinuing said application of heat immediately upon said water reaching 170° F. and allowing said mixture to cool to room temperature, washing said thus cooked corn at said room temperature, and draining off the excess water, grinding the moist cooked corn to form a dough of a fineness such that 100% can be washed through a U.S. No. 20 screen and 75% can be washed through a U.S. No. 325 screen and adjusting the moisture content thereof during said grinding to substantially 50%, kneading said dough between two oppositely rotated cylindrical rollers having their peripheral cylindric surfaces spaced .014" apart, stripping said thus treated dough from said rolls, cutting said rolled dough to desired chips, dehydrating said chips from 50% down to a moisture content of 15%, said dehydration step being undertaken in an oven ranging from 675 to 725 degrees F. for a period of 30 seconds, and finally frying said dehydrated chips in shortening for a period of 30 seconds at a temperature of 370° F. to produce a chip with numerous small surface blisters of good texture and flakeness and of light golden brown when removed from and drained of said shortening ready for salting and packaging.

References Cited in the file of this patent

UNITED STATES PATENTS

| | | |
|---|---|---|
| 2,002,053 | Doolin | May 21, 1935 |
| 2,665,214 | Scott | Jan. 5, 1954 |

OTHER REFERENCES

The Texas Cookbook, 1949, by Coleman et al., A.A. Wyn Inc. (N.Y.), pp. 149, 186, 187.